April 25, 1967  W. ROSS  3,316,052
MEANS OF MOUNTING GLASS OR MIRROR TO BACKING
Filed Dec. 13, 1962  4 Sheets-Sheet 1

INVENTOR.
WILLIAM ROSS
BY
ATTORNEY

April 25, 1967 W. ROSS 3,316,052
MEANS OF MOUNTING GLASS OR MIRROR TO BACKING
Filed Dec. 13, 1962 4 Sheets-Sheet 2

INVENTOR.
WILLIAM ROSS
BY
ATTORNEY

April 25, 1967　　　　W. ROSS　　　　3,316,052
MEANS OF MOUNTING GLASS OR MIRROR TO BACKING
Filed Dec. 13, 1962　　　　　　　　　　　　　4 Sheets-Sheet 3

INVENTOR.
WILLIAM ROSS
BY
ATTORNEY

April 25, 1967  W. ROSS  3,316,052
MEANS OF MOUNTING GLASS OR MIRROR TO BACKING
Filed Dec. 13, 1962
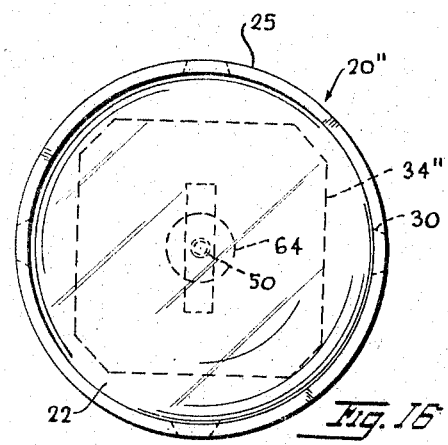
Fig. 16
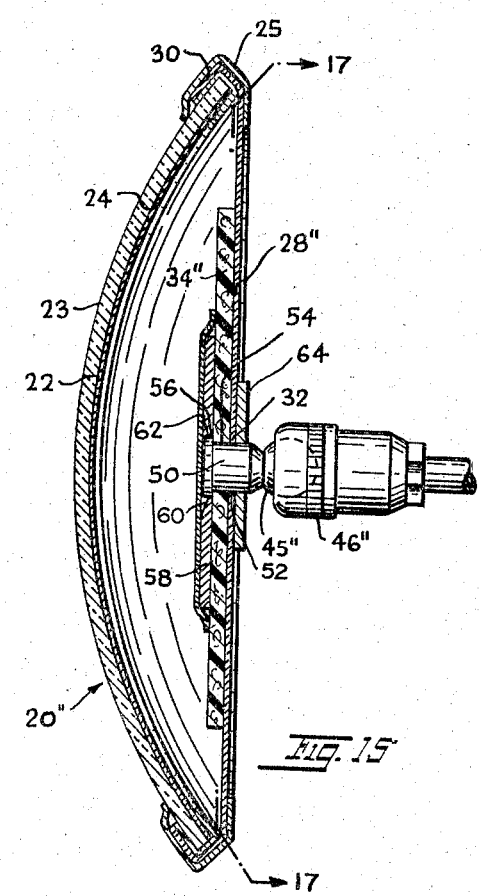
Fig. 15
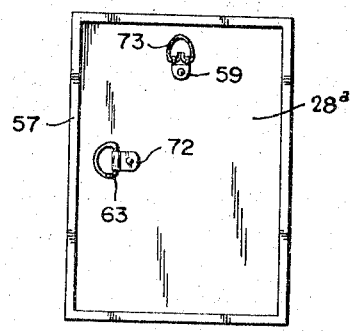
Fig. 19
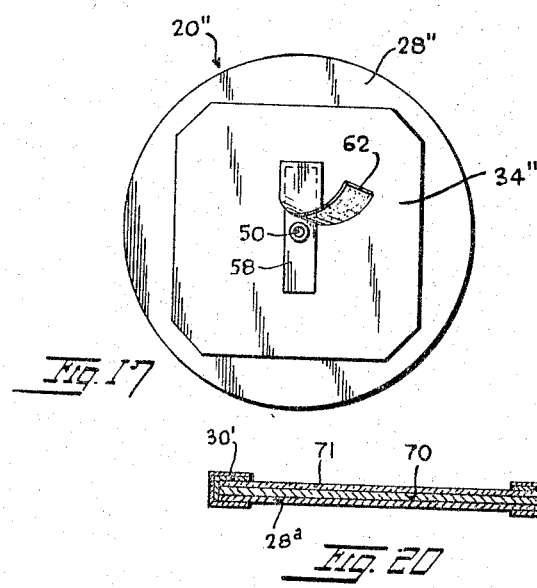
Fig. 17
Fig. 20
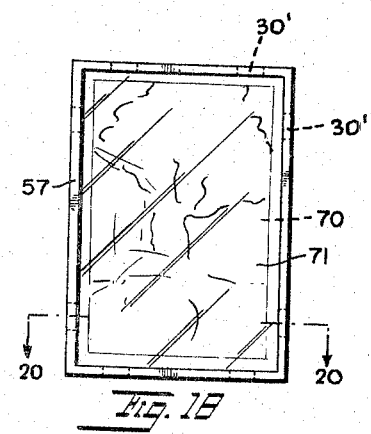
Fig. 18
INVENTOR.
WILLIAM ROSS
BY
ATTORNEY United States Patent Office 3,316,052
Patented Apr. 25, 1967

3,316,052
MEANS OF MOUNTING GLASS OR MIRROR
TO BACKING
William Ross, 56 Ferndale Road,
Paramus, N.J. 07652
Filed Dec. 13, 1962, Ser. No. 244,520
2 Claims. (Cl. 350—293)

This invention relates to mirror mounting means and more particularly concerns mounting means for rectangular or round convex mirrors.

The invention is especially directed at providing safe and secure mounting means for a mirror assembly such as used in stores and other public places to reflect a view of a rather large area. A primary purpose of the invention is to provide a rugged, inexpensive light weight mounting structure adaptable to support mirrors of various sizes.

According to the invention a typical mirror such as a round convex mirror is first covered all around its periphery with resilient adhesive tape. A backing sheet is then applied to the concave rear side of the mirror. The sheet is a circular disk made of thin, pliable sheet metal such as aluminum. The sheet has circumferentially spaced radial tabs which are bent over the tape-covered periphery of the mirror. Then another adhesive tape cover is applied over the bent tabs and the first tape all around the periphery of the mirror. A generally rectangular plate is secured to the center of the disk on either or both sides to serve as a stiffener. The disk extends diametrally across the rear or concave side of the mirror. To the disk and stiffener plate can be mounted a bracket for supporting the mirror on an angularly adjustable support. The bracket can be connected to the support by a universal joint or other joint for adjustable tilting of the mirror.

It is therefore a primary object of the invention to provide a novel mirror assembly.

Another object is to provide a backing disk for a mirror having a tape-covered edge, and a stiffener plate attached to the disk, the disk having tabs bent over the periphery of the mirror to support the same.

For further comprehension of the invention, and of the objects and advantages thereof, references will be had to the following description and accompanying drawings, and to the appended claims in which the various novel features of the invention are more particularly set forth.

In the accompanying drawings forming a material part of this disclosure:

FIG. 15 is a sectional view similar to FIG. 2 showing a mirror assembly embodying still another modified form of the invention.

FIG. 16 is a reduced rear view thereof.

FIG. 17 is a reduced sectional view taken on the line 17—17 of FIG. 15.

FIG. 18 is a front elevational view of a frame embodying another modification of the invention.

FIG. 19 is a rear view thereof.

FIG. 20 is a cross-sectional view taken on the line 20—20 of FIG. 18.

Figure 1:
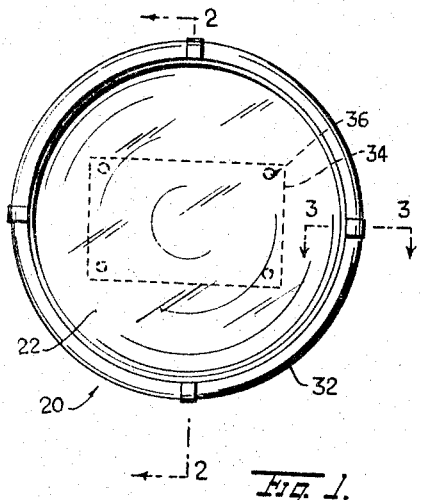
FIG. 1 is a front elevational view of a mirror assembly embodying the invention.
Figure 3:
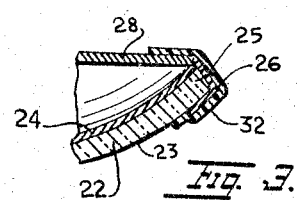
FIG. 3 is a fragmentary sectional view on an enlarged scale taken on line 3—3 of FIG. 2.
Figure 2:
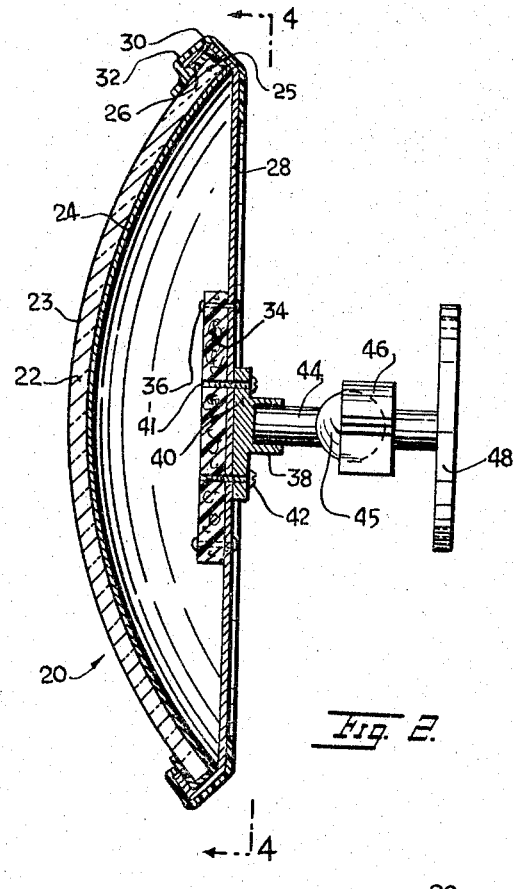
FIG. 2 is a sectional view on an enlarged scale taken on line 2—2 of FIG. 1.
Figure 4:
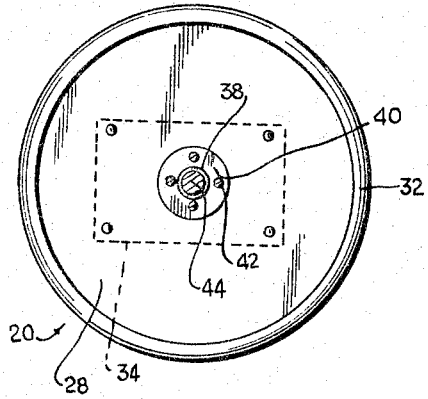
FIG. 4 is a rear view partially in section of the mirror assembly of FIG. 1, taken on line 4—4 of FIG. 2, but on the same scale as FIG. 1.
Figure 5:
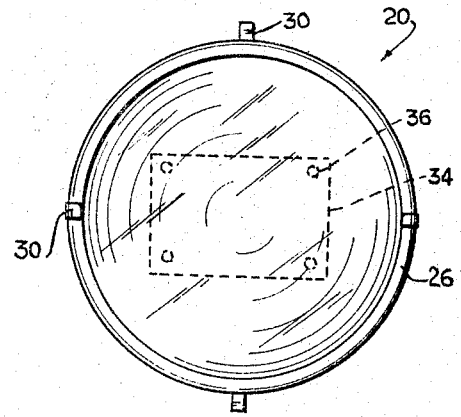
FIG. 5 is a front view of the mirror assembly of FIG. 1 at an intermediate stage of assembly of the mounting means.
Figure 6:
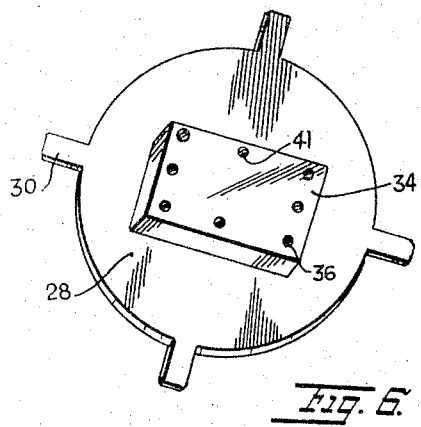
FIG. 6 is a perspective view of a mounting plate as used in the assembly of the mirror mounting.
Figure 7:
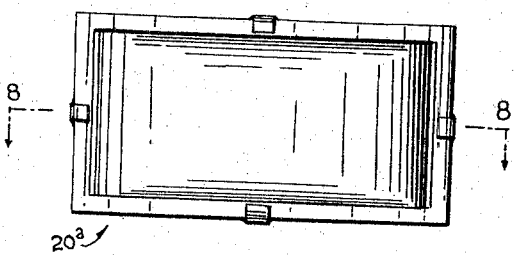
FIG. 7 and FIG. 9 are front and rear elevational views, respectively, of another mirror assembly embodying the invention.
Figure 8:
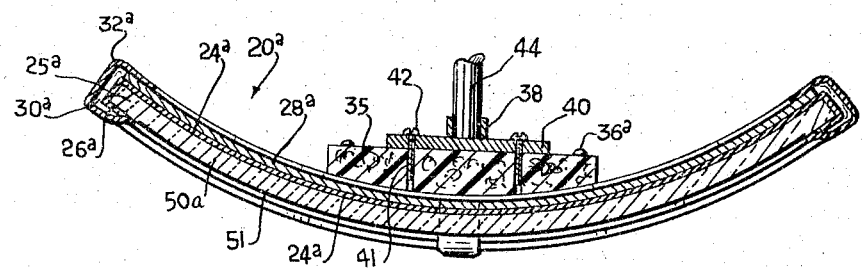
FIG. 8 is a sectional view on an enlarged scale taken on line 8—8 of FIG. 7.
Figure 9:
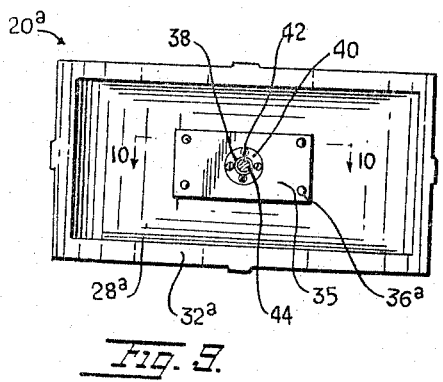
Figure 10:
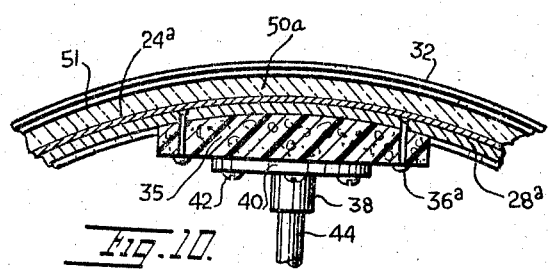
FIG. 10 is a fragmentary sectional view taken on line 10—10 of FIG. 9.
Figure 11:
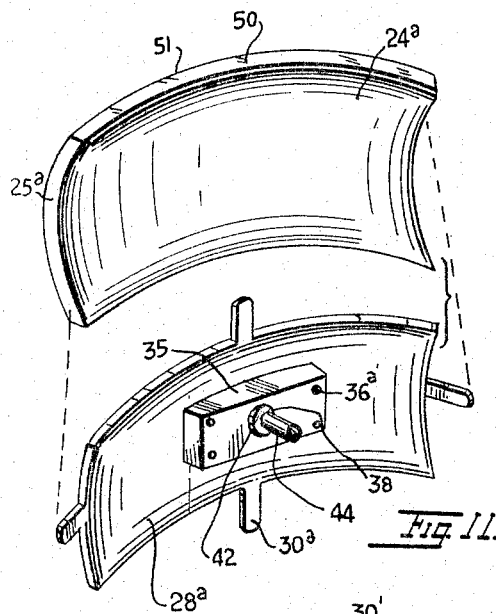
FIG. 11 is an exploded perspective view of parts of the mirror assembly of FIGS. 7–10.

Referring to the drawings, there is shown in FIGS. 1–6, a mirror assembly 20 including a transparent round glass or plastic mirror 22 having a convex outer side 23. The inner concave side of the mirror is coated with a light reflective coating 24. The circular peripheral edge 25 of the mirror is covered with an adhesive tape 26 which adheres to the edge 25.

A flat circular disk 28 made of thin sheet metal extends across the concave back of the mirror. The diameter of disk 28 is about equal to mirror edge 25. This disk, as clearly shown in FIG. 6, has a plurality of circumferentially spaced radial tabs 30. The tabs 30 are bent forwardly over the edge of the mirror and engage on the convex outer side over tape 26. Another adhesive tape 32 is applied over the periphery of the mirror to reinforce and seal the assembly. It covers both tape 26 and the tabs 30. It holds the tabs in place and prevents turning of the mirror inside the tabs with respect to the disk 28.

On the inner side of the disk 28 is a rectangular, rigid plate 34. This plate may be made of Masonite or the like and is secured by rivets 36 to the center of the disk. A bracket fitting 38 having a flange 40 is secured by screws 42 to the disk. The screws extend through holes in the disk and are engaged in holes 41 in the plate 34 as clearly shown in FIG. 4. The fitting 38 may have a post 44 extending outwardly thereof. A ball 45 on the outer end of the post is engaged in a universal joint bearing 46 supported by a mounting plate 48. Plate 48 can be secured to a support such as a wall, ceiling, column or other support. The mirror can be angularly positioned in any direction by pivoting the post with respect to plate 48. The plate 34 serves to stiffen the thin, pliable metal disk and anchors the bracket fitting 38. Other types of brackets may be used instead of that shown in the drawing.

In FIGS. 7–11 is shown another mirror assembly 20$^a$. This assembly has a rectangular mirror 50$^a$ which is spherically curved with a convex outer side 51. The rear concave side of the mirror is coated with a light reflective coating 24$^a$. The periphery 25$^a$ of the mirror is covered with a protective adhesive tape 26$^a$. A rectangular disk 28$^a$ is bent to conform in a shape with the concave side of the mirror and abuts the coating 24$^a$. The disk has spaced tabs 30$^a$ bent over the edges of the mirror on the tape 26$^a$. An outer adhesive tape 32$^a$ covers both the inner tape 26$^a$ and the bent tabs. A stiffener block or plate 35 is secured to the outer concave side of the disk 28$^a$ by rivets 36$^a$. A mounting bracket fitting 38 having a flange 40 is secured by screws 42 to the plate 35. The screws seat in holes 41. Post 44 extends outwardly of fitting 38 for engaging a swivel joint bearing similar to bearing 46 shown in FIG. 2.

Figure 12:
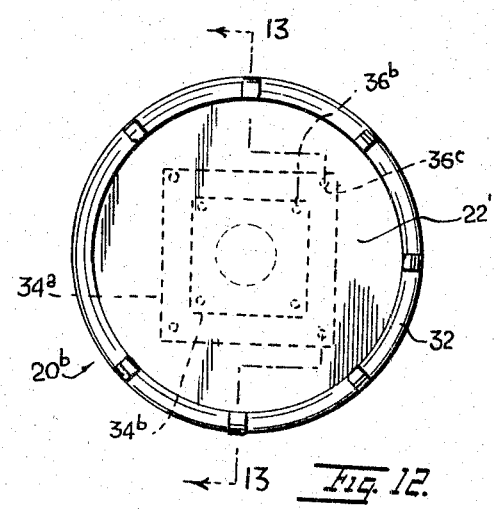
FIG. 12 is a front elevational view of another mirror assembly according to the invention.
Figure 13:
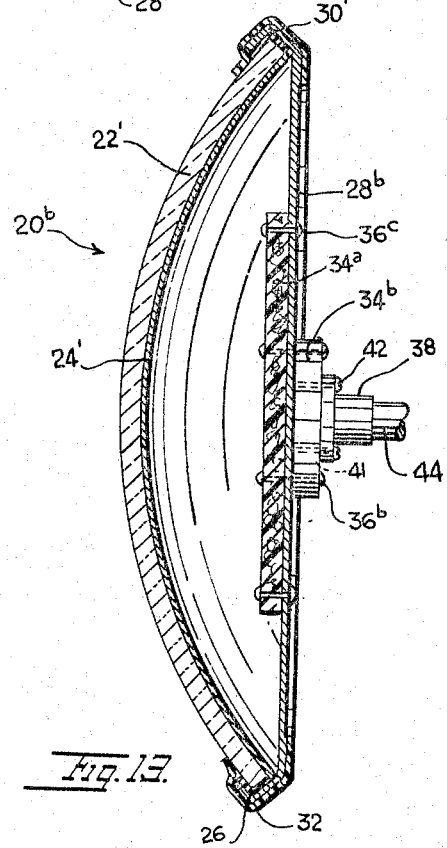
FIG. 13 is a sectional view on an enlarged scale taken on broken line 13—13 of FIG. 12.
Figure 14:
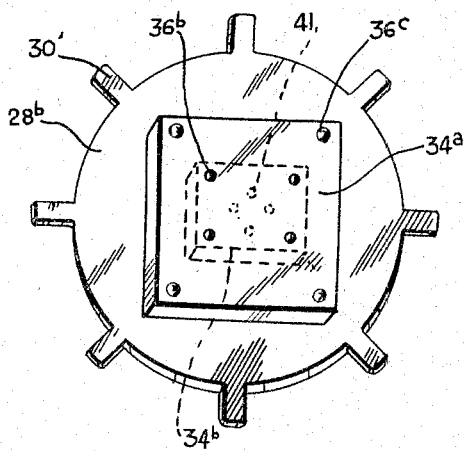
FIG. 14 is a perspective view of a disk and stiffener plate employed in the assembly of FIGS. 12 and 13.

FIGS. 12–14 show another mirror assembly 20$^b$ which is similar to assembly 20 and corresponding parts are identically numbered. Assembly 20ᵇ is arranged for supporting a rather large and heavy mirror 22'. For this purpose, round, flat disk 28ᵇ is provided with a larger number of tabs 30' than disk 28. These tabs are bent over the edge of the mirror. In addition, two rectangular stiffener blocks or plates 34ᵃ, 34ᵇ are provided. Plate 34ᵃ is larger and is disposed on the inner side of the disk facing the concave side of the mirror carrying coating 24'. Plate 34ᵇ is smaller and disposed on the opposite outer side of the disk. The plates are secured together wtih the disk therebetween by rivets 36ᵇ. The plates are centered on the disk. Plate 34ᵃ is also held by rivets 36ᶜ to the disk. Bracket fitting 38 is secured to the outer plate by screws 42 in holes 41 of plate 34ᵃ. Post 44 extends outwardly of the fitting. The assembly includes inner and outer peripheral tapes 26, 32 as in assembly 20.

Although the stiffener blocks and plates 34, 34ᵃ, 34ᵇ and 35 have been shown as rectangular or square, they could be made circular, oval hexagonal or have other geometrical shape.

Referring now to the modified form of mirror assembly 20″ shown in FIGS. 15 to 17, inclusive, in this mirror assembly 20″ a square stiffener block 34″ of Masonite is provided and is secured in position by means of a tubular rivet 50 passing through aligned holes 52, 54 and 56 in rear round flat plate 28″, Masonite block 34″ and in a narrow rectangular-shaped metal plate 58 mounted flatwise on the block 34″, respectively. The inner end of the tubular rivet 50 is peened over the metal plate 58 and the peened end seats in a depressed portion 60 in the plate 58 around the rivet so that the peened end of the rivet is countersunk.

A flexible strip 62 of tape covers the metal plate 58 to protect the mirror therefrom. A metal ball 45″ is supported on the outer end of the rivet 50 and seats in a socket in a round bearing 46″ of a universal joint. A metal washer 64 is placed around the outer end of the rivet 50 to finish off the juncture.

In all other respects, the mirror assembly 20″ is similar to assembly 20.

In FIGS. 18 to 20, inclusive, another modification of the invention is illustrated. This form of the invention takes the shape of a rectangular frame comprising a rectangular shaped thin plate 28ᵃ of sheet metal serving as the backing plate of the frame.

A sheet 70 of paper constituting a picture is superimposed over thin plate 28ᵃ and superimposed over the picture 70 is a transparent panel 71 of glass.

The transparent or glass panel 71 is secured to the backing plate 28ᵃ by means of integral tabs 30' spaced along the back plate on all four peripheral edges thereof. The tabs are bent forward over the edges of the picture 70 and glass 54.

An elongated adhesive tape 57 covers the edges of the backing plate 28ᵃ, picture 70, glass 71 and tabs 30' thereby binding such edges and prevents relative movement of the parts. The tape also reinforces and seals the frame.

On the rear of the backing plate 28ᵃ, a pair of spaced brackets 59 and 72 are secured. Bails 73 and 63 are swingably mounted on the brackets.

In all forms of the invention, a first adhesive tape covers and protects the mirror edge. The metal tabs overlaying and engaging the mirror edge contact only the first tape and do not contact the glass or plastic body of the mirror directly. The outer adhesive tape overlays, covers and protects the inner tape layer and the tabs. The outer tape also serves to anchor the tabs by preventing unrolling or unfolding of the tabs. The mounting structure is adapted for large and small mirrors, flat or curved, round, rectangular or of other geometrical shapes.

It is to be understood that this mounting means may be used for mirrors of any type, or for mounting clear glass or transparent plastic covers over pictures or framed ornaments of any desired size. This arrangement provides a lightweight durable nonrusting, mounting frame.

In framing small pictures or mirrors the rivets 36 as well as the reinforcing plate 34 may be omitted.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A mirror assembly comprising a transparent body having a continuous peripheral edge and opposed convex and concave sides, a light reflective coating on the concave side of said body, an adhesive tape overlaying and covering said edge, a thin flat metal disk disposed on the concave side of said body, said disk having spaced peripheral tabs bent over the peripheral edge of said body and engaged thereat on said tape, a stiffener block on the inner surface of said disk, an elongated metal plate mounted flatwise on said block, said metal disk, block and metal plate having aligned openings, a connecting rivet extending through said aligned openings securing said disk, block and plate to each other flatwise, the inner end of said rivet being peened over the inner metal plate and a ball mounted on the outer end of the rivet adapted to coact with a member of a universal joint.

2. A mirror assembly comprising a transparent body having a continuous peripheral edge and opposed convex and concave sides, a light reflective coating on the concave side of said body, an adhesive tape overlaying and covering said edge, a thin metal flat disk disposed on the concave side of said body, said disk having spaced peripheral tabs bent over the peripheral edge of said body and engaged thereat on said tape, a stiffener block on the inner surface of said disk, an elongated metal plate mounted flatwise on said block, said metal disk, block and metal plate having aligned openings, a connecting rivet extending through said aligned openings securing said disk, block and plate to each other flatwise, the inner end of said rivet being peened over the inner metal plate, a ball of a universal joint mounted on the outer end of the rivet, and a strip of flexible tape secured at its ends to the block covering the metal plate to protect the mirror parts therefrom.

References Cited by the Examiner

UNITED STATES PATENTS

| | | | |
|---|---|---|---|
| 1,309,183 | 7/1919 | Cochrane | 40—152 |
| 1,568,674 | 1/1926 | Knowles | 40—152 |
| 1,754,540 | 4/1930 | Behrendt | 88—98 |
| 1,966,196 | 7/1934 | Benoit | 20—56.4 |
| 2,307,568 | 1/1943 | Colbert | 88—98 |

FOREIGN PATENTS

| | | |
|---|---|---|
| 117,885 | 12/1943 | Australia. |
| 161,638 | 4/1921 | Great Britain. |
| 392,005 | 5/1933 | Great Britain. |

JEWELL H. PEDERSEN, *Primary Examiner.*

O. B. CHEW, *Assistant Examiner.*